Nov. 21, 1939.  P. SCHUFTAN ET AL  2,180,553
PROCESS OF SEPARATING A LIQUID INTO CONSTITUENT PARTS
Filed March 18, 1936
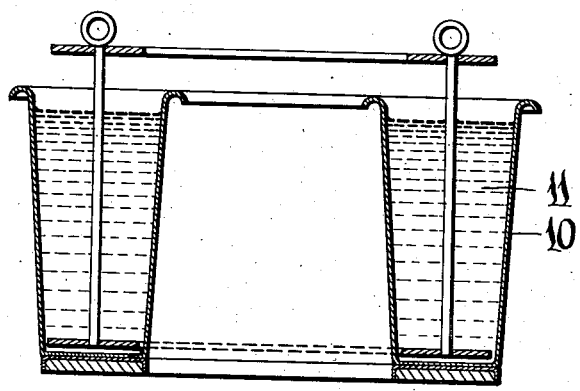
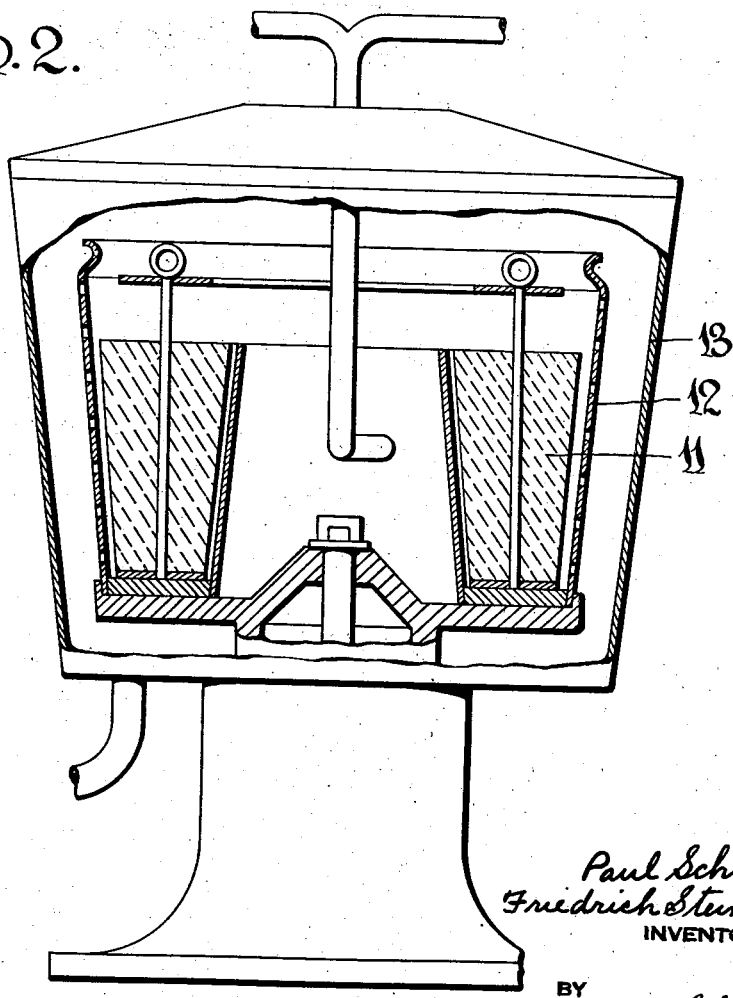
Paul Schuftan
Friedrich Steinbacher
INVENTORS
BY
Potter Pierce + Scheffler
Their ATTORNEYS Patented Nov. 21, 1939

2,180,553

UNITED STATES PATENT OFFICE 2,180,553

PROCESS OF SEPARATING A LIQUID INTO CONSTITUENT PARTS

Paul Schuftan, Hollriegelskreuth, near Munich, and Friedrich Steinbacher, Munich, Germany, assignors of one-half to Gesellschaft für Linde's Eismaschinen A.-G., Wiesbaden, Germany, and one-half to Georg Alexander Krause, Hollriegelskreuth, near Munich, Germany Application March 18, 1936, Serial No. 69,594 In Germany March 26, 1935

8 Claims. (Cl. 62—124)

This invention relates to a process of separating a liquid into its constituent parts and is an improvement in or modification of the process described and claimed in United States Patent No. 2,057,598.

In said patent there is described a process for resolving solutions or liquid mixtures into their individual constituents by cooling to produce a structurally stable body consisting of a solid and a liquid phase, in a container adapted to impart to said body a shape suitable for the apparatus employed for the subsequent separation of the solid and liquid phases, conducting said cooling operation in such a manner that the maximum temperature gradient extends in the direction in which the force acts during the separation of the solid and liquid phases and thereupon placing the body produced by said cooling operation while leaving its shape unaltered, in said apparatus for separating said solid and liquid phases and effecting said separation of said phases therein.

A form of apparatus suitable for effecting the invention is shown in the drawing wherein Fig. 1 is a cross-section of an annular freezing cell and Fig. 2 is a view in elevation with parts broken away of a centrifuge containing the frozen body formed in the cell of Fig. 1.

Thus for example, a solution, such as fruit juices or milk, is cooled in an annular cell 10, the outside diameter of which corresponds to the internal diameter of the basket 12 of the centrifuge 13, until a ring of ice 11, of suitable shape, has formed. This, while still retaining its shape, it transferred to the basket 12 of centrifuge 13, and is there separated into ice and concentrate by centrifugal action.

It has been found that the amount of ice to be deposited during the cooling operation must (within certain limits) bear a definite relation to the concentration of the solution. Should the amount of ice separated fall below the optimum, the ice annulus lacks the mechanical strength necessary for its separation from the concentrate without damage and an objectionably large number of stages are needed for attaining a given concentration. On the other hand, if the quantity be larger, the heat transference value falls unduly and the losses of dissolved substance remaining in the ice are excessive. It has also been found that the amounts of ice to be deposited, in order to attain optimum conditions, depend on the concentration of the original solution; and that the optimum amount of ice deposited is smaller in the case of concentrated solutions than in the case of dilute solutions.

Exhaustive researches have revealed that a certain relation exists between the concentration of the solution under treatment and the amount of concentrate left after the separation of the optimum amount of ice. If the weight of the original solution to be concentrated is represented by 100%, $y$ represents the percentage amount of the concentrate to be separated during freezing, and $x$ the percentage concentration of the original solution, then the optimum relationship of $x$ and $y$ can be formula $$y = \sqrt[n]{x} \cdot C$$

the limiting optional values of constants $n$ and $C$. The optional range of $n$ is between 2 and 3.5 and the corresponding optional range of $C$ is between 9 and 26.

It does not seem possible, at present, to give a direct physical interpretation of this formula. There is more probably an overlapping of two distinct effects which determine the optimum represented by the formula. It is a characteristic feature of the process of the aforesaid patent that the ice is separated out in definitely orientated crystals, and the concentrate collects in the channels lying between them. Depending upon the concentration of the original solution, or that of the inspissated juices to be produced, there is an upper and a lower limit for the amount of ice to be separated. The said lower limit is determined by the stability of the ice skeleton. For this, however, it is not sufficient—as might be assumed from a superficial consideration of the matter—merely that the ice skeleton should be capable of being transferred, from the refrigerating cell to the centrifuge, without suffering damage; but it must also possess sufficient tenacity after the concentrate contained in its cavities has been evacuated. This is because, in centrifuging the ice annulus, the narrow channels present therein are gradually destroyed—even in the event of relatively slight external deformation of the annulus—so that the evacuation of the contained concentrate is impeded and the loss of dissolved substance is increased. The upper limit of the amount of ice separated—above which the heat transference is unduly diminished and the losses increased—is probably determined by the circumstance that the pores remaining in the ice skeleton must exhibit certain minimum dimensions.

From this, it also follows that certain limits must be set for the applicability of the above formula relating to the optimum, and especially in operating with either very dilute, or highly concentrated solutions.

It has now been ascertained in accordance with the present invention that the formation of stratified crystallites—which enables orientation of the contained channels to be obtained in accordance with the invention of the aforesaid patent—is dependent on a certain minimum concentration of the solution. If solutions of lower concentration be cooled in the manner described in said patent, the ice will not separate out in definitely arranged needles, but will form more or less compact blocks, as is known in connection with the manufacture of block ice. Consequently, it is unsuitable to concentrate solutions containing less than a few per cent of dissolved substance, by directly freezing-out the water. According to the present invention, however, such solutions are enriched, prior to the first stage of concentration, by the addition of a concentrate from a previous operation, or one that has been prepared by distillation, the enrichment being carried to such an extent that the content of dissolved substances attains, for example, 3 to 5%, the concentration by refrigeration being deferred until this has been done.

A case of this kind occurs, for example, in the concentration of coffee extract, especially when a cold drawn extract is employed, with the object of retaining the purest possible flavour. Such a solution is therefore so far enriched, in the first place, that the ice separates out in the form of definitely orientated crystallites, and no longer in block form.

It has also been ascertained, by experiment, that there appears to be an upper limit for the application of concentration by refrigeration that is to say, a certain minimum amount of water is essential for further concentrating the solution by the separation of ice, especially in accordance with the process of the aforesaid patent. If an attempt be made to concentrate a stronger solution by freezing-out the water, the amount of ice separable, up to the eutectic point, is no longer sufficient to furnish an ice skeleton suitable for the separation of the solid and liquid phases. Finally, the experiments show not only that in respect of the final stage of concentration there is an upper limit of initial concentration, beyond which further concentration by cold is the cause of unusual difficulties, but also that— apparently independent of the eutectic—in the case of higher water contents, there is a fairly well defined limit as regards the maximum concentration obtainable.

Consequently, on the basis of this knowledge, when carrying the present invention into practice, the following approximate procedure should be adopted in selecting the various stages and corresponding degrees of concentration therein.

To obtain maximum concentrates, instead of attempting to ascertain what is the most favourable degree of concentration for the solution at hand, it is necessary to start from the desired, or attainable, maximum limit of concentration, and to ascertain, in accordance with the specified formula (preferably by means of a graph of same), the most favourable intermediate concentrations for producing the final concentration in question. It has also been found advisable, in producing maximum concentrates, to proceed from an intermediate concentrate, out of which, for attaining the maximum concentration, it is necessary to separate an amount of ice corresponding to the upper optimum limit, because the stability of the ice annulus and the dimensions of the crystals diminish as the concentration of the solution under treatment increases.

It is not until the intermediate concentration has been determined that one can ascertain whether this is, or is not, directly attainable from the original solution in accordance with the optimum conditions specified by the formula.

In the event of the margin between the initial concentration for the final stage and the concentration of the original solution being too great, it will be advisable, for reasons of economy, not to produce the concentrate from the original solution by freezing, but firstly to enrich the original solution with concentrate, in the same manner as in the case of solutions containing only a few units per cent of dissolved substance. This can be partly effected by the addition of unstripped ice from the last stage of concentration, in which—especially in the production of maximum concentrates—owing to merely superficial separation of the solid and liquid phases, a larger proportion of dissolved substance may remain than is possessed by the original solution. The stripping fractions of the higher stages are also suitable for this purpose. A somewhat different method consists in mixing a little sugar (instead of concentrate) in the first stage (for example) of treating fruit juices or milk.

The advantage of this method resides particularly in that, in the concentration of more dilute solutions, under the optimum conditions resulting from the formula, a given increase in the initial concentration means a greater increase in the resulting concentrate.

If, on the other hand, the concentrate obtained in a first stage be enriched, the resulting improvement in the final concentration is smaller than that originally imparted to the solution.

We claim:

1. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment, cooling the liquid to produce said structurally stable body, and subjecting said body to the treatment for separating the liquid and solid phases thereof.

2. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment by adding concentrate from a previous separation treatment, cooling the thus treated liquid to produce said structurally stable body, and subjecting said body to the treatment for separating the liquid and solid phases thereof.

3. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment by adding additional soluble substance to the liquid, cooling the thus treated liquid to produce said structurally stable body, and subjecting said body to the treatment for separating the liquid and solid phases thereof.

4. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment, cooling the thus treated liquid to produce said structurally stable body, subjecting said body to the treatment for separating the liquid and solid phases thereof, and repeating the cooling and separation treatment upon the separated liquid until the maximum final concentration is attained.

5. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment, cooling the thus treated liquid to produce said structurally stable body, subjecting said body to the treatment for separating the liquid and solid phases thereof, and repeating the cooling and separation treatment upon the separated liquid until the maximum final concentration is attained, using for the last stage a liquid of such concentration that an amount of solid phase corresponding to the upper limit of the optimum range is separated.

6. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment by adding thereto unstripped solid phase from a previous operation of the process, cooling the thus treated liquid to produce said structurally stable body, and subjecting said body to the treatment for separating the liquid and solid phases thereof.

7. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment, cooling the liquid to produce said structurally stable body in which the amount $y$ of separable concentrate is equal to $$\sqrt[n]{x}.C$$

in which $x$ is the adjusted concentration of the solution, $n$ has a value between 2 and 3.5 and $C$ has a corresponding value between 9 and 26, and subjecting said body to the treatment for separating the liquid and solid phases thereof.

8. A process of separating a liquid into constituent parts, which comprises adjusting the concentration of said liquid so that the structurally stable body produced in the subsequent cooling step may possess sufficient mechanical strength and contain pores of sufficient width to ensure the success of the ensuing separation treatment by adding thereto a stripping fraction from a previous operation of the process, cooling the thus treated liquid to produce said structurally stable body, and subjecting said body to the treatment for separating the liquid and solid phases thereof.

PAUL SCHUFTAN.
FRIEDRICH STEINBACHER.